United States Patent Office 3,317,558
Patented May 2, 1967

3,317,558
PRODUCTION OF N-SUBSTITUTED PHTHALIMIDINES
Friedrich Becke, Heidelberg, and Elly Jagla, Ludwigshafen (Rhine), Germany, assignors to Badische Anilin- & Soda-Fabrik Aktiengesellschaft, Ludwigshafen (Rhine), Germany
No Drawing. Filed Aug. 13, 1965, Ser. No. 479,658
9 Claims. (Cl. 260—325)

This invention relates to a new method for the production of N-substituted phthalimidines.

N-substituted phthalimidines have already been prepared by reduction of phthalimidines or by reaction of phthalide with amines. It is also known that o-cyanobenzyl chloride may be reacted with primary amines and the resultant o-cyanobenzylamines may be converted into N-substituted phthalimidines by boiling with potassium carbonate solution. In this method, the o-cyanobenzylamine in question is isolated prior to further processing (this being troublesome and time-consuming) and the subsequent hydrolysis can, as is stated in the literature, be carried out completely only with alkaline reagents. The necessary operations impair the yield of phthalimidines.

It is an object of the invention to provide a simple process for the production of N-substituted phthalimidines starting from readily available initial materials. It is another object of the invention to provide a process according to which N-substituted phthalimidines are produced in high yields. These and other objects and advantages will be evident from the following detailed description.

We have found that N-substituted phthalimidines are obtained in a simple way by heating an o-cyanobenzyl chloride or bromide (which may bear as substituents groups which are inert under the reaction conditions) with a primary amine and water.

The reaction may be represented as follows taking as an example the reaction of o-cyanobenzyl chloride with benzylamine:

Suitable cyanobenzyl halides can therefore be represented by the formula

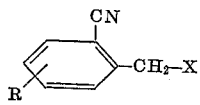

where X denotes chlorine or bromine and R denotes a hydrogen atom, a halogen atom, or an alkyl, alkoxy, acyl, aryl or cyano group.

Suitable primary amines are saturated and unsaturated linear and branched chain aliphatic amines or cycloaliphatic, araliphatic or aromatic amines. Alkylamines having one to eighteen carbon atoms, alkenylamines having three to eighteen carbon atoms, cycloalkylamines having five to thirteen carbon atoms in the cycloalkyl radical, arylamines, particularly those having a phenyl radical, which may also bear alkyl groups having up to four carbon atoms as substituents, and aralkylamines, having a phenyl radical as the aryl radical and an alkylene radical having one to six carbon atoms are particularly suitable.

The amines, when they contain at least three carbon atoms, may also bear inert groups, for example halogen atoms or alkoxy groups, particularly those having one to six carbon atoms, as substituents.

Examples of suitable amines are: butylamine, isobutylamine, 2-ethylhexylamine, laurylamine, allylamine, oleylamine, cyclohexylamine, cyclododecylamine, aniline, toluidines, xylidines, benzylamine, phenylethylamine, 3-methoxypropylamine, β-chloroallylamine, anisidine or 2,4-dicyanoaniline.

The reactants may be used in stoichiometric amounts; in many cases it is preferred however to use an excess of primary amine and an excess of water. Thus molar ratios of o-cyanobenzyl halide to amine of 1:1 to 1:2 and molar amounts of water of 1 to 10 have proved to be very suitable.

It is very simple to carry out the reaction; the reactants

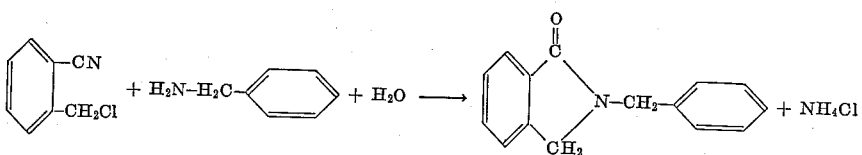

It is surprising that the reaction of o-cyanobenzyl halides with primary amines to form o-cyanobenzylamines, hydrolysis of the nitrile group with water and the formation of the phthalimidine ring can be achieved in one operation.

The o-cyanobenzyl chlorides or bromides, for example o-cyanobenzyl chloride and o-cyanobenzyl bromide, may contain inert groups in the aromatic ring of the benzyl radical, e.g., halogen atoms, particularly chlorine and bromine atoms, alkyl groups, particularly those having one to four carbon atoms in the alkyl group, aryl groups, particularly phenyl groups, alkoxy groups, particularly those having one to four carbon atoms in the alkoxy radical, and acyl groups, particularly those having one to four carbon atoms in the acyl radical, and also cyano groups. For example 2-cyano-4-chlorobenzyl chloride, 2-cyano-4-bromobenzyl chloride, 2-cyano-4-ethylbenzyl bromide, 2-cyano-4-ethoxybenzyl bromide and 2,4-dicyanobenzyl bromide may be used.

may be mixed and boiled under reflux for some time, for example a few hours. The whole is then allowed to cool, the organic layer is taken up in an organic solvent which is not miscible with water, washed first with caustic alkali solution or alkali metal carbonate solution and then with water and dried. Examples of suitable organic solvents are: ethers, methylene chloride, chloroform, benzene or toluene.

The N-substituted phthalimidines are isolated from the solution by distillation.

The process may also be carried out under superatmospheric pressure, for example by heating the initial materials in an autoclave for five to fifteen hours at temperatures of more than 50° C., preferably at from 100° to 200° C.; pressures of up to 50 atmospheres gauge are thus set up. The reaction mixture is worked up in the same way as when the process is carried out at atmospheric pressure.

The N-substituted phthalimidines may be used for example as intermediates for pharmaceuticals or as plasticizers.

The invention is further illustrated by the following examples. The parts are parts by weight.

*Example 1*

75 parts of o-cyanobenzyl chloride is added in small portions to 130 parts of 2-ethylhexylamine. 100 parts of water is added and the whole is boiled under reflux for sixteen hours. The reaction mixture is cooled, taken up with methylene chloride, shaken with 10% caustic soda solution and with water and dried. The methylene chloride is distilled off and the residue is fractionated: After a first runnings consisting of ethylhexylamine, 103 parts (equivalent to 84.3% of the theory) of N-(2-ethylhexyl)-phthalimidine is obtained having a boiling point of 180° to 182° C. at 2 mm. Hg.

*Example 2*

75 parts of o-cyanobenzyl chloride, 100 parts of 2-ethylhexylamine and 36 parts of water are heated to 200° C. in an autoclave for fifteen hours. 110 parts of N-(2-ethylhexyl)-phthalimidine (equivalent to 90% of the theory) is obtained from the reaction mixture after it has been worked up as described in Example 1.

*Example 3*

90 parts of o-cyanobenzyl bromide, 100 parts of isobutylamine and 36 parts of water are heated in a stirred autoclave for five hours at 150° C., a pressure of 10 to 12 atmospheres gauge thereby being set up. The reaction mixture is worked up as described in Example 1, benzene being used as the solvent. 69 parts (equivalent to 79.6% of the theory) of N-isobutylphthalimidine is obtained having a boiling point of 153° to 154° C. at 2 mm. Hg.

*Example 4*

100 parts of o-cyanobenzyl chloride, 400 parts of oleylamine and 48 parts of water are heated at 150° C. in an autoclave for fifteen hours. The reaction mixture is allowed to cool and is worked up as described in Example 1. The yield of N-oleylphthalimidine (boiling point 280° to 285° C. at 3 mm. Hg) is 181 parts (equivalent to 70.3% of the theory).

*Example 5*

75 parts of o-cyanobenzyl chloride, 99 parts of cyclohexylamine and 18 parts of water are heated at 150° C. in an autoclave for five hours. The reaction product is worked up as described in Example 1, chloroform being used as the solvent. 92 parts (equivalent to 86% of the theory) of N-cyclohexylphthalimidine is obtained having a melting point of 107° to 109° C.

*Example 6*

75 parts of o-cyanobenzyl chloride, 160 parts of benzylamine and 36 parts of water are heated to 150° C. in an autoclave for fifteen hours. The reaction mixture is worked up as described in Example 1. 98 parts (equivalent to 88% of the theory) of N-benzylphthalimidine is obtained having a melting point of 89° to 91° C.

*Example 7*

100 parts of o-cyanobenzyl chloride, 186 parts of aniline and 54 parts of water are heated to 140° to 160° C. in an autoclave for twelve hours.

The reaction mixture is cooled, introduced into 500 parts of 20% caustic soda solution and the organic phase is taken up in methylene chloride.

The methylene chloride is driven off and 90 parts of the aniline used is recovered from the residue by fractional distillation in a water jet vacuum. The residue which remains after the aniline has been distilled off is recrystallized from methanol. 110 parts (equivalent to 80.4% of the theory) of N-phenylphthalimidine is obtained having a melting point of 163° to 164° C.

*Example 8*

93 parts of 4-chloro-2-chloromethylbenzonitrile, 185 parts of 2,4-dichloroaniline and 36 parts of water are heated to about 150° C. in an autoclave for twenty hours. The reaction mixture is a grey solid mass and, after it has been cooled, it is suspended in a solution of 30 parts of sodium hydroxide in 870 parts of water. This suspension is shaken with methylene chloride in which the 2,4-dichloroaniline dissolves. The phthalimidine suspended in the aqueous solution is separated and recrystallized from methanol. N-2,4-dichlorophenyl-4-chlorophthalimidine is obtained in a yield of 118.5 parts (equivalent to 75.2% of the theory with reference to 4-chloro-2-chloromethylbenzonitrile).

*Example 9*

88 parts of 2,4-dicyanobenzyl chloride and 93 parts of aniline are heated in the presence of water in an autoclave for fifteen hours at 150° C. The reaction mixture is worked up as described in Example 1. 126 parts of N-phenyl-4-cyanophthalimidine (equivalent to 54% of the theory) is obtained having a melting point of 217° to 218° C.

We claim:

1. A process for the production of N-substituted phthalimidines which comprises heating an o-cyanobenzyl halide having the formula

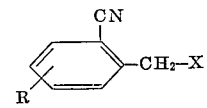

in which X denotes a member of the group consisting of chlorine and bromine and R denotes a substituent selected from the group consisting of hydrogen, a halogen atom, alkyl having 1–4 carbon atoms, phenyl, alkoxy having 1–4 carbon atoms, cyano, and an acyl group having 1–4 carbon atoms with water and a primary amine selected from the group consisting of saturated or olefinically unsaturated, linear or branch chain aliphatic primary amines having 1–18 carbon atoms, cycloalkylamines having 5–13 carbon atoms in the cycloalkyl radical and a primary amino group, phenylamines having a primary amino group and 0–2 alkyl substituents, said alkyl substituents having 1–4 carbon atoms, aralkylamines having a primary amino group, a phenyl radical as the aryl radical and an alkylene radical with 1–6 carbon atoms, and the aforesaid primary amines having at least three carbon atoms and substituted with a member selected from the group consisting of a halogen atom and an alkoxy group with 1–6 carbon atoms.

2. A process as claimed in claim 1 in which the reactants are heated to a temperature above 50° C.

3. A process as claimed in claim 1 in which the reactants are heated to a temperature of 100° to 200° C. under superatmospheric pressure.

4. A process as claimed in claim 1 in which the o-cyanobenzyl halide and the primary amine are used in a molar ratio of 1:1 to 1:2 and water is used in a 1- to 10-molar amount with reference to the o-cyanobenzyl halide.

5. A process as claimed in claim 1 wherein said o-cyanobenzyl halide is a member selected from the group consisting of o-cyanobenzyl chloride and o-cyanobenzyl bromide and said primary amine is an alkylamine having 1–18 carbon atoms and a primary amino group.

6. A process as claimed in claim 1 wherein said o-cyanobenzyl halide is a member selected from the group consisting of o-cyanobenzyl chloride and o-cyanobenzyl bromide and said primary amine is an alkenylamine having 3–18 carbon atoms and a primary amino group.

7. A process as claimed in claim 1 wherein said o-cyanobenzyl halide is a member selected from the group consisting of o-cyanobenzyl chloride and o-cyanobenzyl bromide and said primary amine is cyclohexylamine.

8. A process as claimed in claim 1 wherein said o-cyanobenzyl halide is a member selected from the group consisting of o-cyanobenzyl chloride and o-cyanobenzyl bromide and said primary amine is benzylamine.

9. A process as claimed in claim 1 wherein said o-cyanobenzyl halide is a member selected from the group consisting of o-cyanobenzyl chloride and o-cyanobenzyl bromide and said primary amine is aniline.

References Cited by the Examiner

UNITED STATES PATENTS

| | | | |
|---|---|---|---|
| 2,765,337 | 10/1956 | De Benneville et al. | 260—561 |
| 3,190,916 | 6/1965 | Rainer | 260—559 |

ALEX MAZEL, *Primary Examiner.*

MARY O'BRIEN, *Assistant Examiner.*